United States Patent Office 3,395,939
Patented Aug. 6, 1968

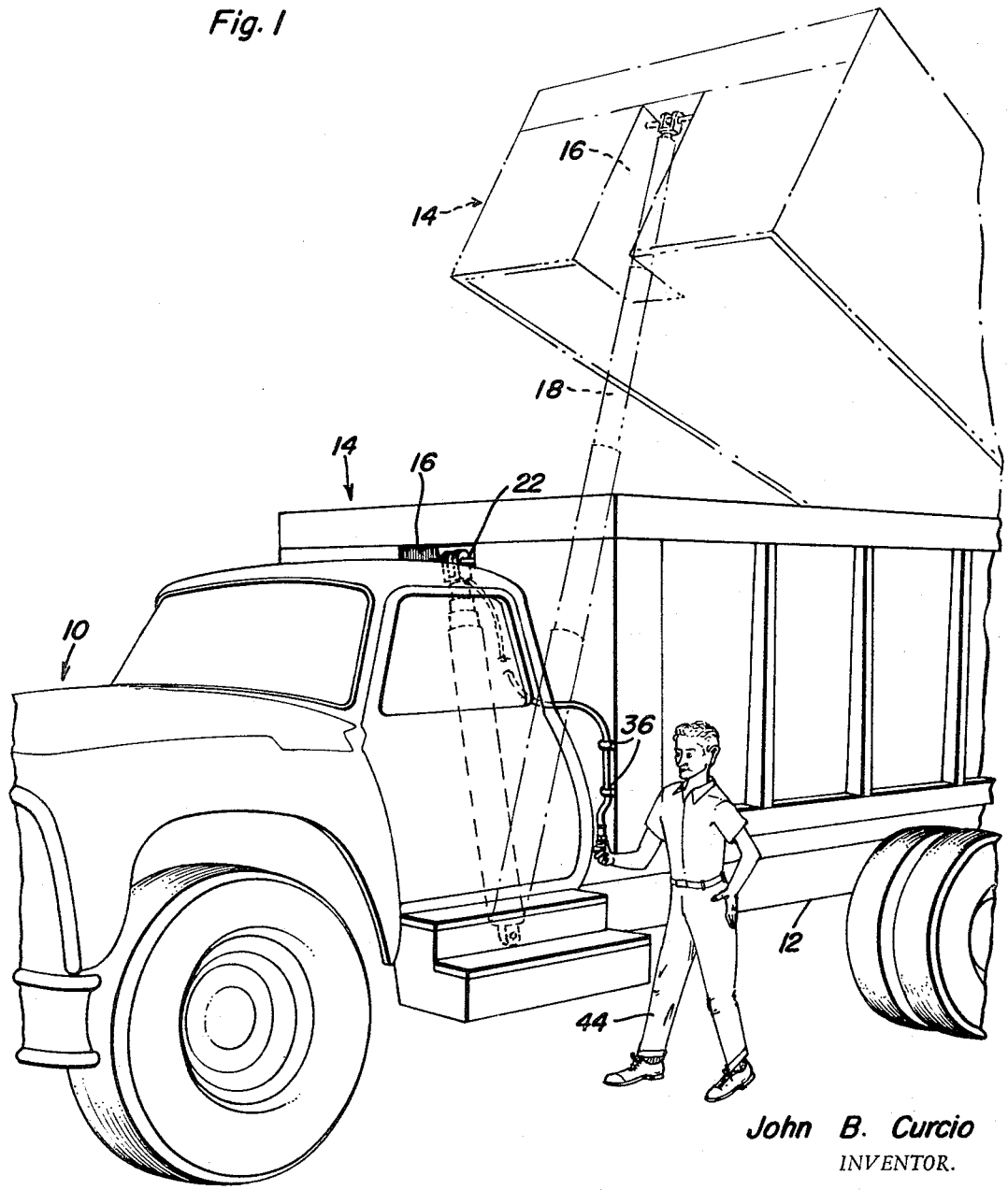

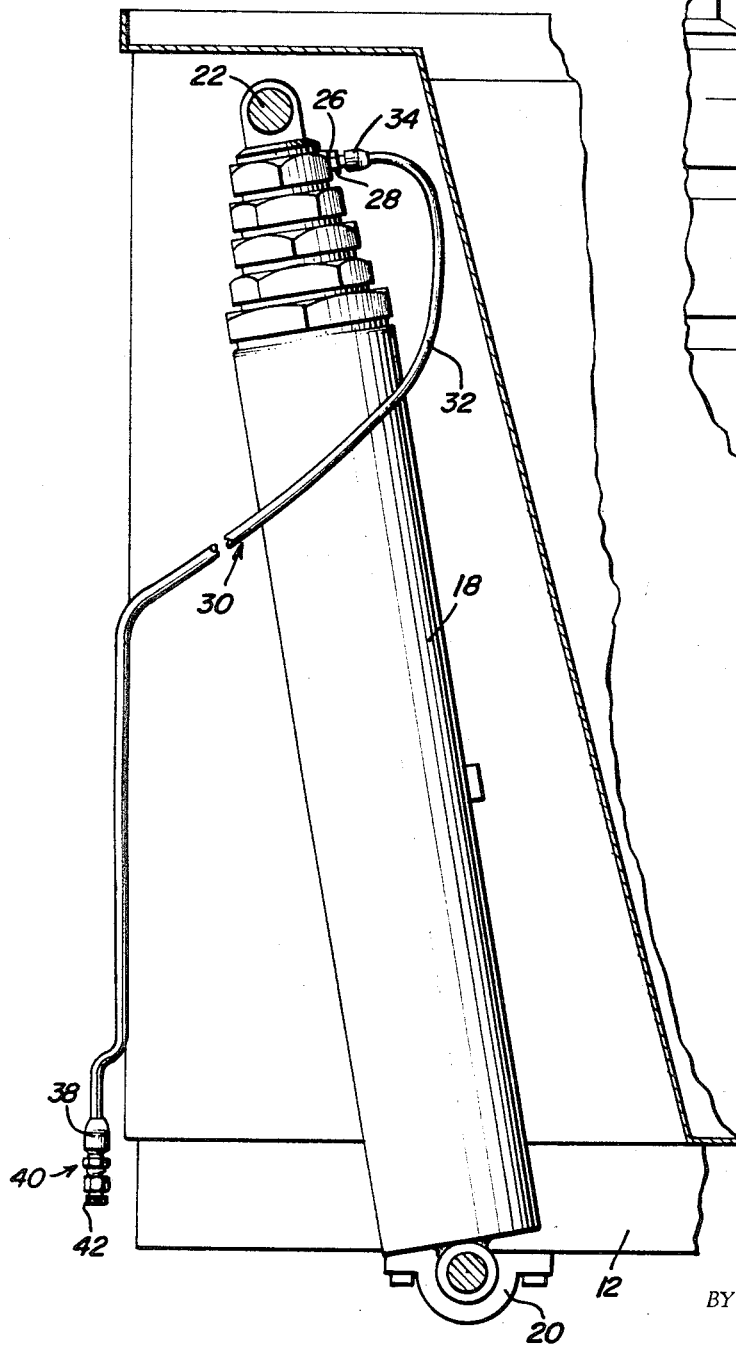
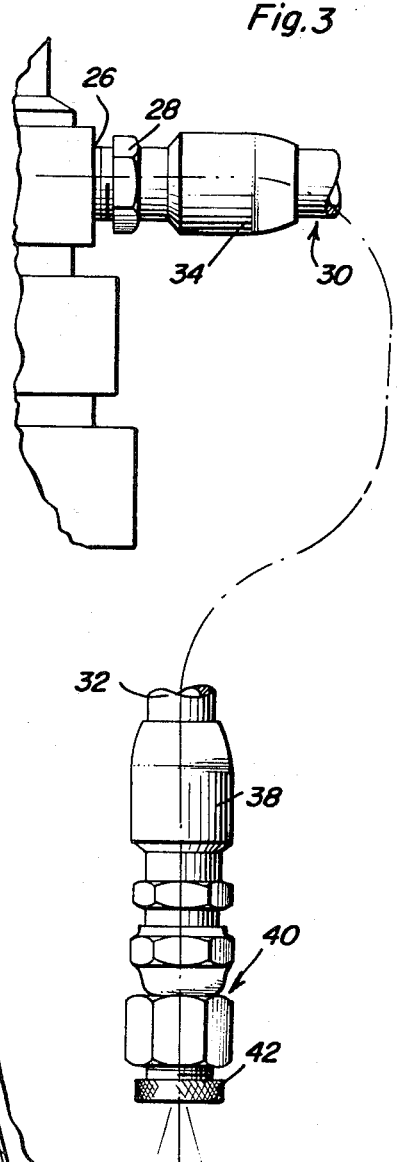

3,395,939
HYDRAULIC CYLINDER AIR BLEED EXTENSION CONDUIT AND VALVE THEREFOR
John B. Curcio, Hazelton, Pa., assignor to Montone Manufacturing Company, a corporation of Pennsylvania
Filed Sept. 27, 1966, Ser. No. 582,289
7 Claims. (Cl. 298—22)

ABSTRACT OF THE DISCLOSURE

An extension bleed conduit having one end communicated with a bleed port in the upper end of an upstanding elongated extendable fluid motor connected between the frame and upper forward portion of the dump load bed of a dump truck of the type whose forward upwardly swingable dump load bed end includes a forwardly and downwardly opening recess in which the upper end of the extendable motor and the bleed port is disposed. The extension bleed conduit is of sufficient length to extend the bleed port in the upper portion of the downwardly opening recess to a forward lower portion of the dump load bed.

---

This invention relates to a novel and useful air bleed assembly and more specifically to an assembly which may be utilized to bleed air from the bleed port of the upper end of a dump truck lifting cylinder from a remote location.

Some types of dump trucks include multi-section extendible fluid motors which are extendible to great lengths and which are, even when fully retracted, of considerable height and therefore received in upstanding recesses in the forward end portions of associated dump truck bodies, the upper ends of the upstanding collapsed extendible fluid motors being pivotally secured to the dump bodies in the upper portion of the aforementioned recesses.

From time to time it becomes necessary to bleed the extendible hydraulic cylinder of a dump truck of the type above set forth and in such instances, inasmuch as the hydraulic cylinder must have its bleed port opened as it is approaching its fully collapsed position after being fully extended, a first person is required to mount the dump body of the truck adjacent the forward end of the dump body and ride up with the dump body as a second person operates the hydraulic cylinder controls. Then, as the person operating the hydraulic controls caused a cylinder to begin to retract in a manner lowering the dump body, the person having ridden up with the dump body opened the bleed port of the cylinder as the dump body approached its lowermost position with the hydraulic cylinder substantially fully collapsed.

It is accordingly the main object of this invention to provide a means whereby the aforementioned dump truck hydraulic cylinder may be properly bled by a person disposed alongside the associated dump truck and in position to have constant control over the operating controls for the hydraulic cylinder. In this manner, a single person operating the hydraulic controls for the hydraulic cylinder may also perform the bleeding operation.

Another object of this invention is to provide a hydraulic cylinder air bleed assembly which will be readily adaptable for use on different but similar dump trucks of different manufacture.

A final object of this invention to be specifically enumerated herein is to provide a hydraulic cylinder air bleed assembly which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a conventional form of dump truck shown with the hydraulic cylinder air bleed extension conduit of the instant invention operatively associated with the bleed port of the dump truck hydraulic cylinder, and alternate dumping position of the dump body of the dump truck and an extended position of the hydraulic cylinder being illustrated in phantom lines;

FIGURE 2 is a fragmentary vertical sectional view illustrating the hydraulic cylinder air bleed extension conduit operatively associated with the dump truck hydraulic cylinder, the latter being disclosed in a fully retracted position; and FIGURE 3 is an enlarged fragmentary side elevational view of the upper and lower end portions of the extension conduit of the instant invention illustrating the connection of the upper end of the conduit to the bleed port of the dump truck hydraulic cylinder and the selectively operable control valve on the lower end of the extension conduit.

Referring now more specifically to the drawings the numeral 10 generally designates a dump truck of conventional design including a main frame 12 and a dump body referred to in general by the reference numeral 14. The dump body 14 is pivotally supported at its rear end to the rear end of the frame 12 in any conventional manner (not shown) and is swingable between the solid and phantom line positions thereof illustrated in FIGURE 1 of the drawings. The dump body 14 includes a forwardly and downwardly opening recess 16 and an upstanding elongated extendible hydraulic cylinder 18 has its lower end pivotally supported from the frame 12 as at 20 and its upper end pivotally secured to an upper portion of the forward end of the dump body 14 by means of a pivot shaft 22 disposed within the recess 16. Accordingly, it may be seen that the hydraulic cylinder 18 may be substantially fully received within the recess 16 when the dump body 14 is in its lowered position and the cylinder 18 is in its fully collapsed position.

The hydraulic cylinder 18 is of conventional design and includes a bleed port 26 in which a fitting 28 is threadedly secured. The fitting 28 actually comprises a part of the present invention constitutes a replacement for a manually operable control valve (not shown) usually threadedly secured in the bleed port 26.

The hydraulic cylinder air bleed extension conduit assembly of the instant invention is generally referred to by the reference numeral 30 and includes a high pressure flexible hydraulic hose or conduit 32 having a fitting 34 on one end operatively coulde to the fitting 26. In addition, the other end of the conduit or hose 32 is supported from the dump body 14 by means of suitable clips 36 and has a fittting 38 secured thereto to which a manually operable control valve assembly generally referred to by the reference numeral 40 is secured. The control valve 40 includes a rotatable actuator 42 which may be rotated in one direction to open the valve 40 and in the other direction to close the valve 40.

In operation, it is customary to bleed the hydraulic cylinder 18 after it has been fully extended to the position thereof illustrated in FIGURE 1 of the drawings and as it is approaching its fully collapsed position illustrated in FIGURE 2 of the drawings. Conventional bleeding of the cylinder 18 requires that one person operate the controls (not shown) for the hydraulic cylinder 18 while another person rides the dump body 14 to its upper position illustrated in phantom lines in FIGURE 1 of the drawings. Then, as the dump body 14 is allowed to be lowered almost to the position thereof illustrated in phantom lines in FIGURE 1 of the drawings, the person riding the dump body 14 opens a control valve assembly (not shown) similar to the control valve 40 operatively engaged in the bleed port 26 in lieu of the fitting 28. However, the extension conduit assembly of the instant invention, a single operator 44 may be disposed alongside the truck 10 in position to be capable of operating the hydraulic controls (not shown) for the hydraulic cylinder 18 and also the control valve assembly 40 as the dump body 14 is lowered from its upper position illustrated in phantom lines in FIGURE 1 of the drawings to its lowered position illustarted in solid lines in FIGURE 1 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a generally horizontal vehicle frame, an elongated load body supported from said frame at one end portion for swinging movement of the other end portion of said load body through an upstanding arc coplanar with the general longitudinal axis of said body between a first elevated position spaced above the adjacent portions of said frame and a second lowered position closely overlying the adjacent portions of said frame, an upstanding elongated extendible fluid motor pivotally connected at its opposite ends to said frame and an upper portion of said load body, the upper end of said motor including a bleed port for bleeding unwanted fluid from said fluid motor, and an extension conduit communicated at one end portion with said bleed port and having its other end portion positioned adjacent the lowermost portion of said other end portion of said load body, said other end portion of said conduit including control valve means adapted to be manually actuated and operable to selectively vent said bleed port to the ambient atmosphere through said conduit.

2. The combination of claim 1 wherein said vehicle frame comprises a dump truck frame and said load body comprises a dump body defining a forward and downwardly opening upstanding recess at its free swinging front end, in the upper end of which recess the upper end of said fluid motor is pivotally secured and said bleed port is located.

3. The combination of claim 1 wherein said conduit comprises a flexible high pressure conduit.

4. The combination of claim 1 wherein said extension conduit comprises a flexible high pressure conduit, said load body including means adjacent the lowermost portion of said other end thereof securing said other end portion of said conduit to said load body a spaced distance from said control valve means.

5. The combination of claim 1 wherein said vehicle frame comprises a dump truck frame and said load body comprises a dump body, said dump body including support means at said other end portion thereof engaged with and stationarily supporting said other end portion of said conduit from said lowermost portion.

6. The combination of claim 5 wherein said support means is engaged with said other end of said conduit means a spaced distance therealong from said control valve means and at least said other end portion of said conduit comprises a flexible high pressure conduit.

7. The combination of claim 8 wherein said dump body defines a forward and downwardly opening upstanding recess at its free swinging front end, in the upper end of which recess the upper end of said fluid motor is pivotally secured and said bleed port is located.

References Cited

UNITED STATES PATENTS

| | | |
|---|---|---|
| 1,621,075 | 3/1927 | Larkin. |
| 2,390,702 | 11/1945 | Gail. |
| 2,738,773 | 3/1956 | Hockensmith _____ 298—22 |
| 2,684,123 | 7/1954 | Mattis _____ 180—1 |

RICHARD J. JOHNSON, *Primary Examiner.*